US012175707B2

(12) United States Patent
Chen et al.

(10) Patent No.: US 12,175,707 B2
(45) Date of Patent: Dec. 24, 2024

(54) METHOD AND DEVICE FOR CONTROLLING MISALIGNMENT OF ELECTRODE PLATES, ELECTRODE PLATES, ELECTROCHEMICAL CELL, AND BATTERY

(71) Applicant: CONTEMPORARY AMPEREX TECHNOLOGY (HONG KONG) LIMITED, Ningde (CN)

(72) Inventors: Canbin Chen, Ningde (CN); Jun Hu, Ningde (CN); Shiping Feng, Ningde (CN); Qiuhui Zheng, Ningde (CN); Wen Chang, Ningde (CN); Qing Wu, Ningde (CN); Haoran Lu, Ningde (CN)

(73) Assignee: CONTEMPORARY AMPEREX TECHNOLOGY CO (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/733,897

(22) Filed: Jun. 5, 2024

(65) Prior Publication Data

US 2024/0320857 A1 Sep. 26, 2024

Related U.S. Application Data

(63) Continuation of application No. PCT/CN2022/072060, filed on Jan. 14, 2022.

(51) Int. Cl.
*G06T 7/73* (2017.01)
*G06T 1/00* (2006.01)
*H01M 10/04* (2006.01)

(52) U.S. Cl.
CPC ............. *G06T 7/74* (2017.01); *G06T 1/0007* (2013.01); *H01M 10/0404* (2013.01); *G06T 2207/10004* (2013.01); *G06T 2207/30164* (2013.01)

(58) Field of Classification Search
None
See application file for complete search history.

(56) References Cited

U.S. PATENT DOCUMENTS 9,095,987 B2 * 8/2015 Min .................. B26D 5/38
11,597,115 B2 * 3/2023 Wi .................. B26D 1/085
(Continued)

FOREIGN PATENT DOCUMENTS

CN 205333066 U 6/2016
CN 109390636 A 2/2019
(Continued)

OTHER PUBLICATIONS

The First Office Action of the patent family application No. KR10-2024-7007361, issued on Jun. 5, 2024 from the KIPO.
(Continued)

*Primary Examiner* — Ian L Lemieux
(74) *Attorney, Agent, or Firm* — Kilpatrick Townsend & Stockton LLP

(57) ABSTRACT

The present application discloses a method and device for controlling misalignment of electrode plates, electrode plates, an electrochemical cell, and a battery. The method includes: acquiring cut hole position information of an anode electrode plate, and calculating a first width deviation value corresponding to the anode electrode plate according to the cut hole position information and a calibration width of the anode electrode plate; acquiring tab position information of a cathode electrode plate, and calculating a second width deviation value corresponding to the cathode electrode plate according to the tab position information and a calibration width of the cathode electrode plate; and when the anode electrode plate and the cathode electrode plate are stacked, adjusting a feed position of the cathode electrode plate according to the first width deviation value, and
(Continued)

compensating for a cut width of the cathode electrode plate according to the second width deviation value.

18 Claims, 4 Drawing Sheets

(56) References Cited

U.S. PATENT DOCUMENTS

| | | | |
|---|---|---|---|
| 2009/0136115 A1* | 5/2009 | Sotooka | G01N 21/95684 |
| | | | 382/141 |
| 2020/0223202 A1* | 7/2020 | Shintani | H01M 10/0404 |
| 2020/0235433 A1* | 7/2020 | Kim | H01M 10/0585 |
| 2021/0083313 A1* | 3/2021 | Kobayashi | H01M 50/466 |
| 2021/0296679 A1* | 9/2021 | Chung | H01M 10/0583 |
| 2023/0420745 A1* | 12/2023 | Xu | G06T 7/0004 |
| 2024/0030482 A1* | 1/2024 | Lu | H01M 10/48 |
| 2024/0202955 A1* | 6/2024 | Duan | H04N 23/90 |

FOREIGN PATENT DOCUMENTS

| | | |
|---|---|---|
| CN | 109444145 A | 3/2019 |
| CN | 109585902 A | 4/2019 |
| CN | 112310568 A | 2/2021 |
| JP | 07326367 A | 12/1995 |
| JP | 2002110148 A | 4/2002 |
| JP | 2011165336 A | 8/2011 |
| JP | 2020027721 A | 2/2020 |

OTHER PUBLICATIONS

The First Office Action of the patent family application No. JP2024-514450, issued on Jul. 30, 2024 from the JPO.
International Search Report received in the corresponding International Application PCT/CN2022/072060, mailed Sep. 1, 2022.
Written Opinion of ISA received in the corresponding International Application PCT/CN2022/072060, mailed Sep. 1, 2022.

* cited by examiner

METHOD AND DEVICE FOR CONTROLLING MISALIGNMENT OF ELECTRODE PLATES, ELECTRODE PLATES, ELECTROCHEMICAL CELL, AND BATTERY

CROSS REFERENCE TO RELATED APPLICATIONS

The present application is a continuation of international application PCT/CN2022/072060, filed on Jan. 14, 2022, entitled "METHOD AND DEVICE FOR CONTROLLING MISALIGNMENT OF ELECTRODE PLATES, ELECTRODE PLATES, ELECTROCHEMICAL CELL, AND BATTERY", which is incorporated by reference herein in its entirety.

TECHNICAL FIELD

The present application relates to the technical field of batteries, and in particular relates to a method and device for controlling misalignment of electrode plates, electrode plates, an electrochemical cell, and a battery.

BACKGROUND

With the development of electronics and the continuous improvement of battery-related techniques, requirements for performance of batteries are increasingly high. As important constitution structures of a battery, electrode plates affect the charge and discharge efficiency of the battery. It is necessary to ensure that a cathode electrode plate is arranged between two cut marks of an anode electrode plate when the two electrode plates are stacked, and if the cut marks of the anode electrode plate cannot be accurately determined, the cathode electrode plate may extend beyond a cut mark of the anode electrode plate, resulting in failed natural stacking of electrode plates and battery safety problems caused by poor misalignment of cathode and anode electrode plates. Therefore, the improvement of poor misalignment of cathode and anode electrode plates is of great significance for improvement of a yield rate of electrochemical cells.

SUMMARY

The implementation of the present application at least partially improves the above problems, and can effectively reduce a probability of misalignment of cathode and anode electrode plates and improve a yield rate of electrochemical cells.

In order to solve the above technical problems, the implementation of the present application adopts the following technical solution: In a first aspect, the embodiment of the present application provides a method for controlling misalignment of electrode plates, including: acquiring cut hole position information of an anode electrode plate, and calculating a first width deviation value corresponding to the anode electrode plate according to the cut hole position information and a calibration width of the anode electrode plate; acquiring tab position information of a cathode electrode plate, and calculating a second width deviation value corresponding to the cathode electrode plate according to the tab position information and a calibration width of the cathode electrode plate; and when the anode electrode plate and the cathode electrode plate are stacked, adjusting a feed position of the cathode electrode plate according to the first width deviation value, and compensating for a cut width of the cathode electrode plate according to the second width deviation value, such that a preset distance is kept between edges of the cathode electrode plate and the anode electrode plate overlapping with each other. The embodiment provided by the present application can keep a preset distance between edges of the cathode electrode plate and the anode electrode plate overlapping with each other, which can avoid poor misalignment of the cathode electrode plate and the anode electrode plate and improve a yield rate of electrochemical cells; and the embodiment of present application can allow differential deviation compensation for cathode electrode plates, such that finally, widths of the cathode electrode plates can be maintained well consistent.

In some embodiments, the calculating a first width deviation value corresponding to the anode electrode plate according to the cut hole position information and a calibration width of the anode electrode plate includes: when a sensor detects a cut hole of the anode electrode plate, acquiring a detection width of a previous anode electrode plate adjacent to the anode electrode plate according to a distance between cut holes of the anode electrode plate and the previous anode electrode plate adjacent to the anode electrode plate, and calculating a width deviation value of the previous anode electrode plate according to the detection width and the calibration width of the anode electrode plate. In this embodiment, the cut hole of the anode electrode plate is detected by a sensor, a width deviation value of the anode electrode plate is calculated according to the detected cut hole information, and then a feed position of a cathode electrode plate is compensated according to the width deviation value; and in this way, a feed position of each cathode electrode plate can be compensated, which can avoid poor misalignment of the cathode electrode plate and the anode electrode plate and improve a yield rate of electrochemical cells.

In some embodiments, the method further includes: acquiring a calibration position deviation value corresponding to a calibration position of a cut hole photographed by a camera; when the sensor does not detect the cut hole of the anode electrode plate and the currently detected anode electrode plate meets photographing conditions of the camera, acquiring a cut mark image of the currently detected anode electrode plate, and acquiring a detection width deviation value of the currently detected anode electrode plate according to the cut mark image; and calculating a difference between the detection width deviation value and the calibration position deviation value, where the difference is a width deviation value of the currently detected anode electrode plate. In this embodiment, in the case of failed detection of the sensor, a deviation is calculated by a camera, which can effectively avoid poor misalignment of the cathode electrode plate and the anode electrode plate and improve a yield rate of electrochemical cells.

In some embodiments, the acquiring a calibration position deviation value corresponding to a calibration position of a cut hole photographed by a camera includes: when the sensor detects the cut hole of the anode electrode plate for the first time and the photographing conditions of the camera are met, acquiring a cut mark image corresponding to the cut hole, and acquiring the calibration position deviation value according to the cut mark image and a calibration position of the cut hole of the anode electrode plate. In this embodiment, by acquiring a calibration position deviation value corresponding to a calibration position of a cut hole photographed by a camera according to a cut mark image and a calibration position of the cut hole of the anode electrode plate, the calibration position deviation value can be accurately acquired to accurately calculate a width deviation value of the anode electrode plate, thereby accurately compensating for a feed position of a cathode electrode plate.

In some embodiments, when the sensor detects the cut hole of the anode electrode plate for the first time, that the photographing conditions of the camera are met specifically includes: acquiring a first distance between the sensor and the camera; acquiring position information of the cut hole of the anode electrode plate detected by the sensor for the first time, where the position information includes a second distance; and when a distance corresponding to position information of a cut hole photographed currently by the camera is equal to a sum of the first distance and the second distance, determining that the photographing conditions of the camera are met. In this embodiment, photographing conditions when the sensor detects the cut hole of the anode electrode plate for the first time are limited, such that the photographing of the camera can be triggered according to the conditions, thereby ensuring that, even in the case of failed detection of the sensor, a width deviation value corresponding to the anode electrode plate can be acquired to compensate for a feed position of a cathode electrode plate.

In some embodiments, when the sensor detects the cut hole of the anode electrode plate not for the first time, that the photographing conditions of the camera are met specifically includes: acquiring a cut mark image of a cut hole that is of a previously detected anode electrode plate and corresponds to the cut hole of the anode electrode plate, where the cut mark image of the cut hole of the previously detected anode electrode plate includes a first cut mark distance; acquiring a cut mark image of the cut hole of the anode electrode plate, where the cut mark image of the cut hole of the anode electrode plate includes a second cut mark distance; and when the second cut mark distance is equal to a sum of the first cut mark distance and the calibration width of the anode electrode plate, determining that the photographing conditions of the camera are met. In this embodiment, photographing conditions when the sensor detects the cut hole of the anode electrode plate not for the first time are limited, such that the photographing of the camera can be triggered according to the conditions, thereby ensuring that, even in the case of failed detection of the sensor, a width deviation value corresponding to the anode electrode plate can be acquired to compensate for a feed position of a cathode electrode plate.

In some embodiments, the calculating a second width deviation value corresponding to the cathode electrode plate according to the tab position information and a calibration width of the cathode electrode plate includes: when the sensor detects tabs of the cathode electrode plate, recording position information of each of the tabs; when a number of the tabs detected by the sensor is greater than a preset threshold, calculating an average width of a preset threshold number of the cathode electrode plates according to the recorded position information of the tabs; and calculating a difference between the calibration width of the cathode electrode plate and the average width, where the difference is the width deviation value of the cathode electrode plate. In this embodiment, tabs of the cathode electrode plate are detected and then a width of the cathode electrode plate is acquired according to the tabs, such that the width of the cathode electrode plate can be uniformly compensated by calculating a width deviation value, resulting in excellent width consistency of the cathode electrode plate; and tabs of the cathode electrode plate are detected to dynamically adjust a width of the cathode electrode plate, thereby correcting misalignment of the tabs.

In a second aspect, the embodiment of the present application provides a device for controlling misalignment of electrode plates, including: a first calculation module configured to acquire cut hole position information of an anode electrode plate and calculate a first width deviation value corresponding to the anode electrode plate according to the cut hole position information and a calibration width of the anode electrode plate; a second calculation module configured to acquire tab position information of a cathode electrode plate and calculate a second width deviation value corresponding to the cathode electrode plate according to the tab position information and a calibration width of the cathode electrode plate; and an electrode plate misalignment handling module configured to: when the anode electrode plate and the cathode electrode plate are stacked, adjust a feed position of the cathode electrode plate according to the first width deviation value, and compensate for a cut width of the cathode electrode plate according to the second width deviation value, such that a preset distance is kept between edges of the cathode electrode plate and the anode electrode plate overlapping with each other. The embodiment provided by the present application can keep a preset distance between edges of the cathode electrode plate and the anode electrode plate overlapping with each other, which can avoid poor misalignment of the cathode electrode plate and the anode electrode plate and improve a yield rate of electrochemical cells; and the embodiment of present application can allow differential deviation compensation for cathode electrode plates, such that finally, widths of the cathode electrode plates can be maintained well consistent.

In some embodiments, the first calculation module includes: a first calculation unit configured to: when a sensor detects the cut hole of the anode electrode plate, acquire a detection width of a previous anode electrode plate adjacent to the anode electrode plate according to a distance between cut holes of the anode electrode plate and the previous anode electrode plate adjacent to the anode electrode plate, and calculate a width deviation value of the previous anode electrode plate according to the detection width and the calibration width of the anode electrode plate. In this embodiment, the cut hole of the anode electrode plate is detected by a sensor, a width deviation value of the anode electrode plate is calculated according to the detected cut hole information, and then a feed position of a cathode electrode plate is compensated according to the width deviation value; and in this way, a feed position of each cathode electrode plate can be compensated, which can avoid poor misalignment of the cathode electrode plate and the anode electrode plate and improve a yield rate of electrochemical cells.

In some embodiments, the first calculation module further includes: a first acquisition unit configured to acquire a calibration position deviation value corresponding to a calibration position of a cut hole photographed by a camera; a second acquisition unit configured to: when the sensor does not detect the cut hole of the anode electrode plate and the currently detected anode electrode plate meets photographing conditions of the camera, acquire a cut mark image of the currently detected anode electrode plate, and acquire a detection width deviation value of the currently detected anode electrode plate according to the cut mark image; and a second calculation unit configured to calculate a difference between the detection width deviation value and the calibration position deviation value, where the difference is a width deviation value of the currently detected anode electrode plate. In this embodiment, in the case of failed detection of the sensor, a deviation is calculated by a camera, which can effectively avoid poor misalignment of the cathode electrode plate and the anode electrode plate and improve a yield rate of electrochemical cells.

In some embodiments, the first acquisition unit is specifically configured to: when the sensor detects the cut hole of the anode electrode plate for the first time and the photographing conditions of the camera are met, acquire a cut mark image corresponding to the cut hole, and acquire the calibration position deviation value according to the cut mark image and a calibration position of the cut hole of the anode electrode plate. In this embodiment, by acquiring a calibration position deviation value corresponding to a calibration position of a cut hole photographed by a camera according to a cut mark image and a calibration position of the cut hole of the anode electrode plate, the calibration position deviation value can be accurately acquired to accurately calculate a width deviation value of the anode electrode plate, thereby accurately compensating for a feed position of a cathode electrode plate.

In some embodiments, when the sensor detects the cut hole of the anode electrode plate for the first time, that the photographing conditions of the camera are met specifically includes: acquiring a first distance between the sensor and the camera; acquiring position information of the cut hole of the anode electrode plate detected by the sensor for the first time, where the position information includes a second distance; and when a distance corresponding to position information of a cut hole photographed currently by the camera is equal to a sum of the first distance and the second distance, determining that the photographing conditions of the camera are met. In this embodiment, photographing conditions when the sensor detects the cut hole of the anode electrode plate for the first time are limited, such that the photographing of the camera can be triggered according to the conditions, thereby ensuring that, even in the case of failed detection of the sensor, a width deviation value corresponding to the anode electrode plate can be acquired to compensate for a feed position of a cathode electrode plate.

In some embodiments, when the sensor detects the cut hole of the anode electrode plate not for the first time, that the photographing conditions of the camera are met specifically includes: acquiring a cut mark image of a cut hole that is of a previously detected anode electrode plate and corresponds to the cut hole of the anode electrode plate, where the cut mark image of the cut hole of the previously detected anode electrode plate includes a first cut mark distance; acquiring a cut mark image of the cut hole of the anode electrode plate, where the cut mark image of the cut hole of the anode electrode plate includes a second cut mark distance; and when the second cut mark distance is equal to a sum of the first cut mark distance and the calibration width of the anode electrode plate, determining that the photographing conditions of the camera are met. In this embodiment, photographing conditions when the sensor detects the cut hole of the anode electrode plate not for the first time are limited, such that the photographing of the camera can be triggered according to the conditions, thereby ensuring that, even in the case of failed detection of the sensor, a width deviation value corresponding to the anode electrode plate can be acquired to compensate for a feed position of a cathode electrode plate.

In some embodiments, the second calculation module is specifically configured to: when the sensor detects tabs of the cathode electrode plate, record position information of each of the tabs; when a number of the tabs detected by the sensor is greater than a preset threshold, calculate an average width of a preset threshold number of the cathode electrode plates according to the recorded position information of the tabs; and calculate a difference between the calibration width of the cathode electrode plate and the average width, where the difference is the width deviation value of the cathode electrode plate. In this embodiment, tabs of the cathode electrode plate are detected and then a width of the cathode electrode plate is acquired according to the tabs, such that the width of the cathode electrode plate can be uniformly compensated by calculating a width deviation value, resulting in excellent width consistency of the cathode electrode plate; and tabs of the cathode electrode plate are detected to dynamically adjust a width of the cathode electrode plate, thereby correcting misalignment of the tabs.

In a third aspect, the embodiment of the present application provides a device for controlling misalignment of electrode plates, including: a sensor, a camera, and a controller, where the controller is connected to each of the sensor and the camera; the sensor is configured to detect cut hole position information of an anode electrode plate and detect tab position information of a cathode electrode plate; the camera is configured to acquire a cut mark image corresponding to the anode electrode plate; and the controller includes: at least one processor and a memory in communication connection with the at least one processor, where the memory stores an instruction capable of being executed by the at least one processor, and the instruction is executed by the at least one processor, such that the at least one processor executes the method for controlling misalignment of electrode plates described above based on the cut hole position information, the tab position information, and the cut mark image. The embodiment provided by the present application can keep a preset distance between edges of the cathode electrode plate and the anode electrode plate overlapping with each other, which can avoid poor misalignment of the cathode electrode plate and the anode electrode plate and improve a yield rate of electrochemical cells; and the embodiment of present application can allow differential deviation compensation for cathode electrode plates, such that finally, widths of the cathode electrode plates can be maintained well consistent.

In a fourth aspect, the embodiment of the present application provides electrode plates, where the electrode plates include an anode electrode plate and a cathode electrode plate; and the anode electrode plate and the cathode electrode plate are subjected to a misalignment treatment by the method for controlling misalignment of electrode plates described above, such that a preset distance is kept between edges of the cathode electrode plate and the anode electrode plate overlapping with each other. Among the electrode plates provided by the embodiment of the present application, a preset distance can be kept between edges of the cathode electrode plate and the anode electrode plate, such that a probability of poor misalignment is low.

In a fifth aspect, the embodiment of the present application provides an electrochemical cell, including a separator, and the anode electrode plate and the cathode electrode plate described above. The electrochemical cell provided by the embodiment of the present application has an excellent yield rate.

In a sixth aspect, the embodiment of the present application provides a battery, including an electrolyte, a packaging case, and the electrochemical cell described above. The battery provided by the embodiment of the present application has high safety and excellent stability.

The embodiment of the present application provides a method and device for controlling misalignment of electrode plates, electrode plates, an electrochemical cell, and a battery. In the method, a first width deviation value corresponding to an anode electrode plate is calculated according to cut hole position information and a calibration width of the anode electrode plate, and a second width deviation value corresponding to a cathode electrode plate is calculated according to tab position information and a calibration width of the cathode electrode plate; and when electrode plates are stacked, a feed position of a corresponding cathode electrode plate is compensated through the first width deviation value, and a cut width of the cathode electrode plate is compensated through the second width deviation value. The embodiment provided by the present application can keep a preset distance between edges of the cathode electrode plate and the anode electrode plate overlapping with each other, which can avoid poor misalignment of the cathode electrode plate and the anode electrode plate and improve a yield rate of electrochemical cells; and in addition, the embodiment of present application can allow differential deviation compensation for cathode electrode plates, such that finally, widths of the cathode electrode plates can be maintained well consistent.

BRIEF DESCRIPTION OF THE DRAWINGS

One or more embodiments are exemplarily illustrated through corresponding accompanying drawings, and these exemplary descriptions do not constitute a limitation to the embodiments. Components with the same reference numerals in the accompanying drawings are denoted as similar components, and the accompanying drawings are not limited by scale unless otherwise specified.

DETAILED DESCRIPTION OF THE EMBODIMENTS

The embodiments of the technical solutions of the present application will be described in detail below with reference to the accompanying drawings. The following embodiments are used merely to clearly illustrate the technical solutions of the present application. Therefore, these embodiments are merely exemplary and are not intended to limit the protection scope of the present application.

Unless otherwise defined, all technical and scientific terms used herein have the same meanings as commonly understood by those skilled in the technical field of the present application. The terms used herein are merely intended to describe the specific embodiments, rather than limit the present application. The terms "includes" and "has" in the specification, claims, and accompanying drawings of the present application and any variations thereof are intended to encompass without excluding other content.

In the description of the embodiments of the present application, the technical terms such as "first" and "second" are used merely to distinguish different objects, and cannot be understood as indicating or implying relative importance or implicitly indicating a number, a specific order, or a primary/secondary relationship of the indicated technical features.

The term "embodiment" mentioned herein means that a specific feature, structure, or characteristic described in combination with the embodiment may be included in at least one embodiment of the present application. The term appearing in different parts of the specification does not necessarily refer to the same embodiment or an independent or alternative embodiment exclusive of other embodiments. It may be explicitly or implicitly appreciated by those skilled in the art that the embodiments described herein may be combined with other embodiments.

Figure 1:
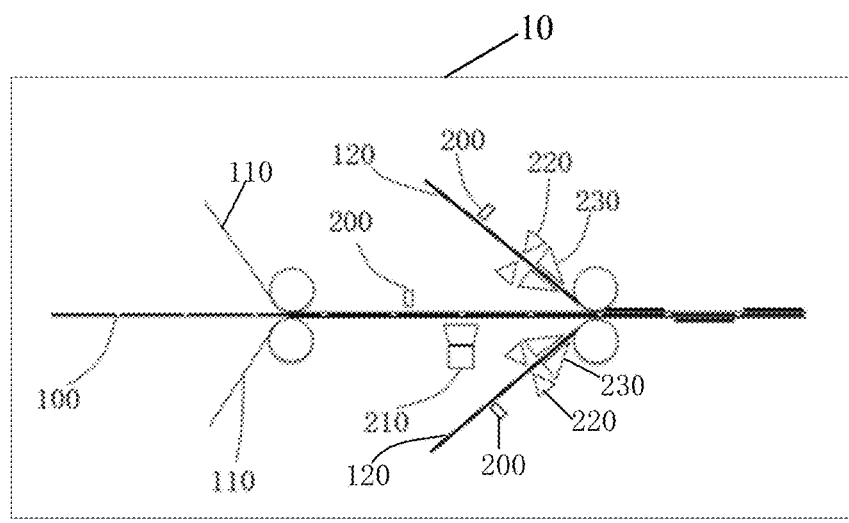
FIG. 1 is a schematic structural diagram of a stacking machine provided in an embodiment of the present application.

FIG. 1 is a schematic structural diagram of a stacking machine provided in an embodiment of the present application. The stacking machine 10 includes: an anode electrode plate 100, a separator 110, a cathode electrode plate 120, a sensor 200, a camera 210, a cutter 220, and a feed mechanism 230.

In the field of battery assembly, the anode electrode plate 100 and the cathode electrode plate 120 are usually isolated through the separator 110, and stacked sequentially to produce an electrochemical cell with a specified thickness. During stacking, a distance between edges of the anode electrode plate 100 and the cathode electrode plate 120 needs to be kept within a required range, such as to avoid misalignment of the anode electrode plate 100 and the cathode electrode plate 120. In a related technique, a blank position of an anode electrode plate of each electrochemical cell is detected by a sensor, and the blank position of the anode electrode plate of the electrochemical cell refers to a blank position left on the anode electrode plate after the anode electrode plate and a cathode electrode plate are stacked in the electrochemical cell, which can compensate for an overall feed position of the cathode electrode plate. The related technique cannot allow differential deviation compensation for electrode plates, and in the case of failed detection of the sensor, a deviation cannot be calculated, resulting in poor misalignment of feed electrode plates. In view of this, in the embodiment of the present application, a feed position of the cathode electrode plate 120 is compensated by detecting a cut hole position of the anode electrode plate 100; and when the sensor 200 corresponding to the anode electrode plate 100 fails to detect a cut hole position of the anode electrode plate 100, a detection width deviation value of the anode electrode plate 100 is acquired through an image captured by the camera 210 to compensate for the feed position of the cathode electrode plate 120. In addition, a position of a tab of the cathode electrode plate 120 is detected, and a width of the cathode electrode plate 120 is acquired according to position information of the tab, that is, the width of the cathode electrode plate 120 is compensated through the tab, which can ensure that widths of the cathode electrode plate 120 and the anode electrode plate 100 each are within a specified range. In addition, misalignment of tabs is corrected according to the detected position of the tab. The stacking machine 10 shown in FIG. 1 can be used in a method for controlling misalignment of electrode plates provided in an embodiment of the present application. When the stacking machine 10 works, after the anode electrode plate 100 with a cut mark and a cut hole is compounded with the separator 110, the sensor 200 constantly detects the cut hole and locates, and the camera 210 photographs the cut hole to identify a calibration position deviation value of the cut hole of the anode electrode plate 100. The sensor 200 corresponding to the cathode electrode plate 120 detects and locates a tab of the cathode electrode plate 120, and after a width deviation value of the cathode electrode plate is calculated, the cutter 220 is used to compensate for a width of the cathode electrode plate 120 according to the calculated deviation value of the cathode electrode plate, and a cathode electrode plate 120 of an appropriate width is cut. The feed mechanism 230 compensates for the feed position of the cathode electrode plate 120 according to a deviation value determined based on the cut hole, where the deviation value determined based on the cut hole may be a first width deviation value of an anode electrode plate calculated according to the cut hole position information and calibration width of the anode electrode plate detected by the sensor 200, and the calibration width is a set value of a width of the anode electrode plate and can be set according to a process; and a detection width of the anode electrode plate may also be acquired through an image captured by the camera 210, and the first width deviation value is calculated according to the detection width. The first width deviation value refers to a value to compensate for the feed position of the cathode electrode plate 120, and is provided to compensate for the feed position of the cathode electrode plate 120. In this way, the cathode electrode plate 120 can be fed to an accurate position of the anode electrode plate 100.

There are a plurality of sensors 200, and the plurality of sensors are arranged at corresponding positions of the anode electrode plate 100 and the cathode electrode plate 120, respectively; and the plurality of sensors 200 are configured to detect cut hole position information of the anode electrode plate 100 and detect tab position information of the cathode electrode plate 120.

Figure 2:
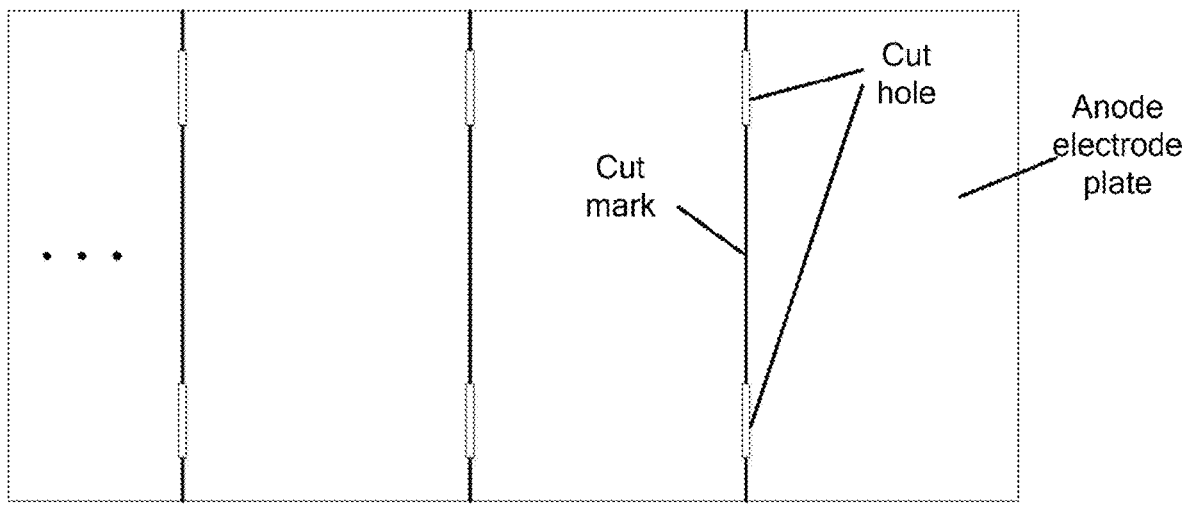
FIG. 2 is a schematic diagram of a cut mark image provided in an embodiment of the present application.

The camera 210 may be a charge coupled device (CCD) camera. The camera 210 is configured to capture a cut mark image corresponding to the anode electrode plate 100, as shown in FIG. 2. The cut mark image includes a cut mark and a cut hole, the cut mark is a mark through a vertical feed direction of the anode electrode plate 100, and a number of anode electrode plates 100 can be determined according to cut marks, for example, there is an anode electrode plate between every two adjacent cut marks. The cut hole is a hole on the cut mark, a length of the hole can be less than a length of the cut mark, and generally, the cut hole coincides with the cut mark.

Figure 3:
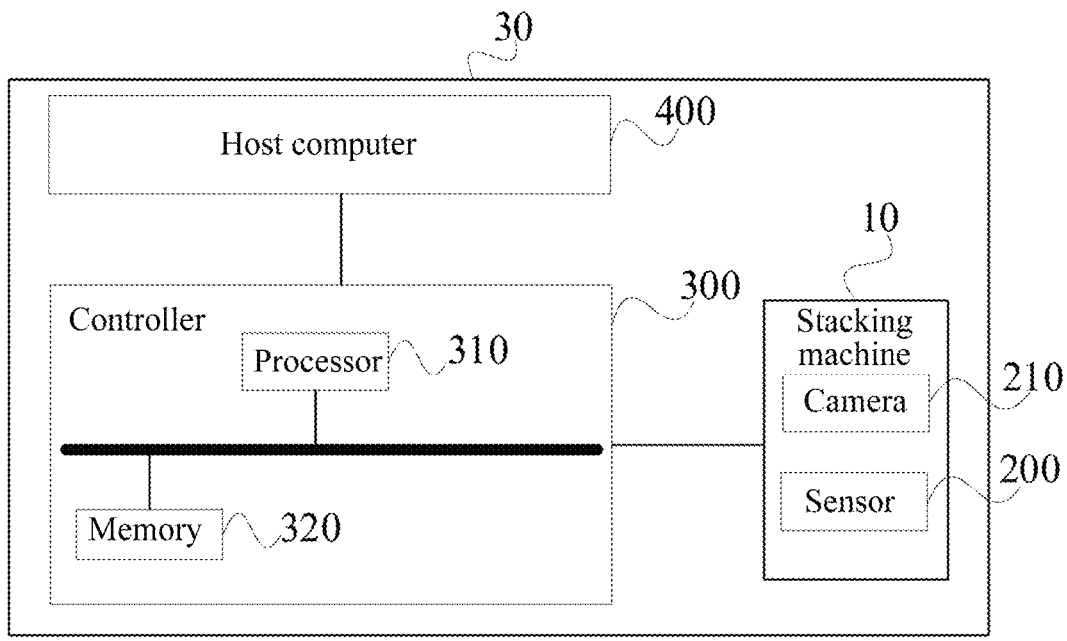
FIG. 3 is a schematic structural diagram of a device for controlling misalignment of electrode plates provided in an embodiment of the present application.

FIG. 3 is a schematic structural diagram of a device for controlling misalignment of electrode plates provided in an embodiment of the present application. The device 30 for controlling misalignment of electrode plates includes the stacking machine 10, a controller 300, and a host computer 400. The controller 300 is in communication connection with each of the stacking machine 10 and the host computer 400; and the controller 300 may be arranged as a separate individual independent of the stacking machine 10, or may be integrated in the stacking machine 10 as a part of the stacking machine 10.

In an embodiment of the present application, the stacking machine 10 detects cut hole position information of the anode electrode plate 100 through the sensor 200 corresponding to the anode electrode plate 100 and tab position information of the cathode electrode plate 120, and also acquires a cut mark image of the anode electrode plate 100 through the camera 210. The controller 300 may send an instruction to the stacking machine 10, such as to control a sensor 200 corresponding to the anode electrode plate 100 to detect a cut hole position of the anode electrode plate 100 and a sensor 200 corresponding to the cathode electrode plate 120 to detect a tab position; and the controller 300 may also send an instruction to the stacking machine 10, such as to control the camera 210 to capture an image. A cut mark image captured by the camera 210 can be transmitted to the host computer 400; the host computer 400 processes the cut mark image to obtain a cut mark deviation, where the cut mark deviation is a deviation value corresponding to a calibration position of a cut hole photographed by the camera, namely, the calibration position deviation value; and the cut mark deviation is sent to the controller 300. The controller 300 acquires the cut hole position information, the tab position information, and the cut mark image, and then controls misalignment of electrode plates according to the cut hole position information, the tab position information, and the cut mark image, thereby ensuring that the cathode electrode plate 120 is placed at an accurate position of the anode electrode plate 100. For example, the controller 300 is configured to acquire cut hole position information of an anode electrode plate and calculate a first width deviation value corresponding to the anode electrode plate according to the cut hole position information and a calibration width of the anode electrode plate, where the calibration width is a set value of a width of the anode electrode plate and can be set according to a process; is configured to acquire tab position information of a cathode electrode plate and calculate a second width deviation value corresponding to the cathode electrode plate according to the tab position information and a calibration width of the cathode electrode plate; and is configured to: when the anode electrode plate and the cathode electrode plate are stacked, adjust a feed position of the cathode electrode plate according to the first width deviation value, and compensate for a cut width of the cathode electrode plate according to the second width deviation value, such that a preset distance is kept between edges of the cathode electrode plate and the anode electrode plate overlapping with each other.

The controller 300 may be a programmable logic controller (PLC). The host computer 400 may be specifically a desktop computer, a laptop, a tablet computer, a smart phone, or the like.

Specifically, as shown in FIG. 3, the controller 300 includes one or more processors 310 and a memory 320, and a processor 310 is taken as an example in FIG. 3. The processor 310 and the memory 320 may be connected through a bus or another means, and the connection through a bus is taken as an example in FIG. 3.

Figure 4:
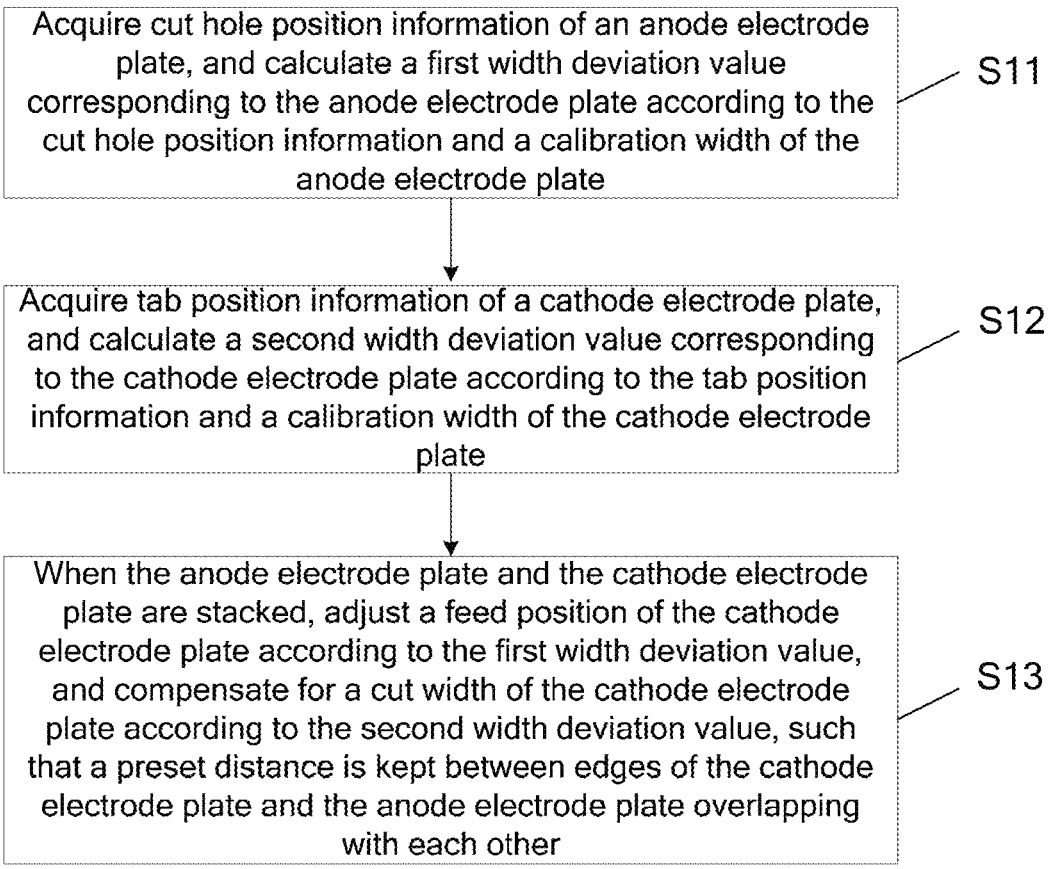
FIG. 4 is a flow chart of a method for controlling misalignment of electrode plates provided in an embodiment of the present application.

As a non-volatile computer-readable storage medium, the memory 320 may be configured to store a non-volatile software program, a non-volatile computer-executable program, and a module, such as a program instruction/module corresponding to a method for controlling misalignment of electrode plates in an embodiment of the present application. The processor 310 runs the non-volatile software program, instruction, and module stored in the memory 320 to execute various functional applications and data processing of the controller 300, namely, to implement the method for controlling misalignment of electrode plates in the embodiment. For example, the method shown in FIG. 4 is executed.

The memory 320 may include a program storage area and a data storage area, and the program storage area may store an operating system and an application program required by at least one function. The data storage area may store data created according to the use of the device for controlling misalignment of electrode plates. In addition, the memory 320 may include a high-speed random access memory, and may further include a non-volatile memory, such as at least one magnetic disk memory, a flash memory, or another non-volatile memory. In some embodiments, the memory 320 may optionally include a memory remotely arranged relative to the processor 310, the memory remotely arranged may be connected to the device for controlling misalignment of electrode plates through a network, and examples of the network include, but are not limited to, the Internet, a local area network (LAN), a mobile communication network (MCN), an enterprise internal network, and a combination thereof.

One or more modules are stored in the memory 320, and when executed by one or more processors 310, the one or more modules implement the method for controlling misalignment of electrode plates in the embodiment.

The device 30 for controlling misalignment of electrode plates provided in the embodiment of the present application may be used to implement the method for controlling misalignment of electrode plates provided in the embodiment of the present application, and has corresponding functional modules and beneficial effects of implementation of the method, and technical details not described in the embodiment of the present application may refer to the method for controlling misalignment of electrode plates provided in the embodiment of the present application.

FIG. 4 is a flow chart of a method for controlling misalignment of electrode plates provided in an embodiment of the present application. The method can be used in the device shown in FIG. 1 and FIG. 3. The method can allow differential deviation compensation for electrode plates, and in the case of failed detection of the sensor, a deviation of an electrode plate can also be calculated to compensate for an electrode plate. Specifically, the method may include the following steps:

S11: Cut hole position information of an anode electrode plate is acquired, and a first width deviation value corresponding to the anode electrode plate is calculated according to the cut hole position information and a calibration width of the anode electrode plate.

Electrode plates include an anode electrode plate (also known as a negative electrode plate) and a cathode electrode plate (also known as a positive electrode plate), where the positive electrode plate has a first coating region coated with a cathode active material and a positive tab not coated with a cathode active material; and the negative electrode plate has a second coating region coated with an anode active material and a negative tab not coated with an anode active material. An electrochemical cell has a positive tab cluster including a plurality of positive tabs and a negative tab cluster including a plurality of negative tabs. An electrode plate has a plurality of tabs that are arranged at a specified interval.

In an embodiment of the present application, each anode electrode plate is provided with a cut hole, and a shape and size of the cut hole is not specifically limited in the embodiment of the present application. The cut hole position information refers to a specific position of a cut hole on an electrode plate and can be detected by the sensor; the cut hole refers to a hole penetrating through an anode electrode plate; and when a sensor detects a cut hole, if there is transmitted light at a position of the anode electrode plate and there is no transmitted light at other positions, the sensor can detect a position of the cut hole according to this condition, namely, the cut hole position information. The cut hole is detected to acquire a width of the anode electrode plate, where the width of the anode electrode plate can be understood as a distance between two adjacent cut holes in a feed direction of the stacking machine; and according to the acquired width of the anode electrode plate, a feed position of a cathode electrode plate can be accurately determined. The calibration width of the anode electrode plate refers to a set value of the width of the anode electrode plate, and is set according to a process. The first width deviation value refers to a value to compensate for the feed position of the cathode electrode plate. The feed position refers to a position at which the cathode electrode plate is placed during stacking, and the position is compensated such that the cathode electrode plate is placed at an accurate position. The first width deviation value is provided to compensate for a feed position of each cathode electrode plate other than the first cathode electrode plate. Each cathode electrode plate has a first width deviation value correspondingly. When the first cathode electrode plate is detected by the sensor for the first time, a feed position is confirmed, such that the feed position of the first cathode electrode plate does not need to be compensated.

In an embodiment of the present application, cut hole position information of an anode electrode plate may be detected by the sensor, and the first width deviation value is calculated according to the cut hole position information and the calibration width. However, when a cut hole is not completely broken during production of the cut hole, the sensor cannot detect the cut hole, or when a cut hole is not in a detection range of the sensor due to mis-operation of a material belt, the sensor cannot detect the cut hole. In the above cases, a detection width of the anode electrode plate can be acquired through an image captured by the camera, and the first width deviation value is calculated.

Figure 5:
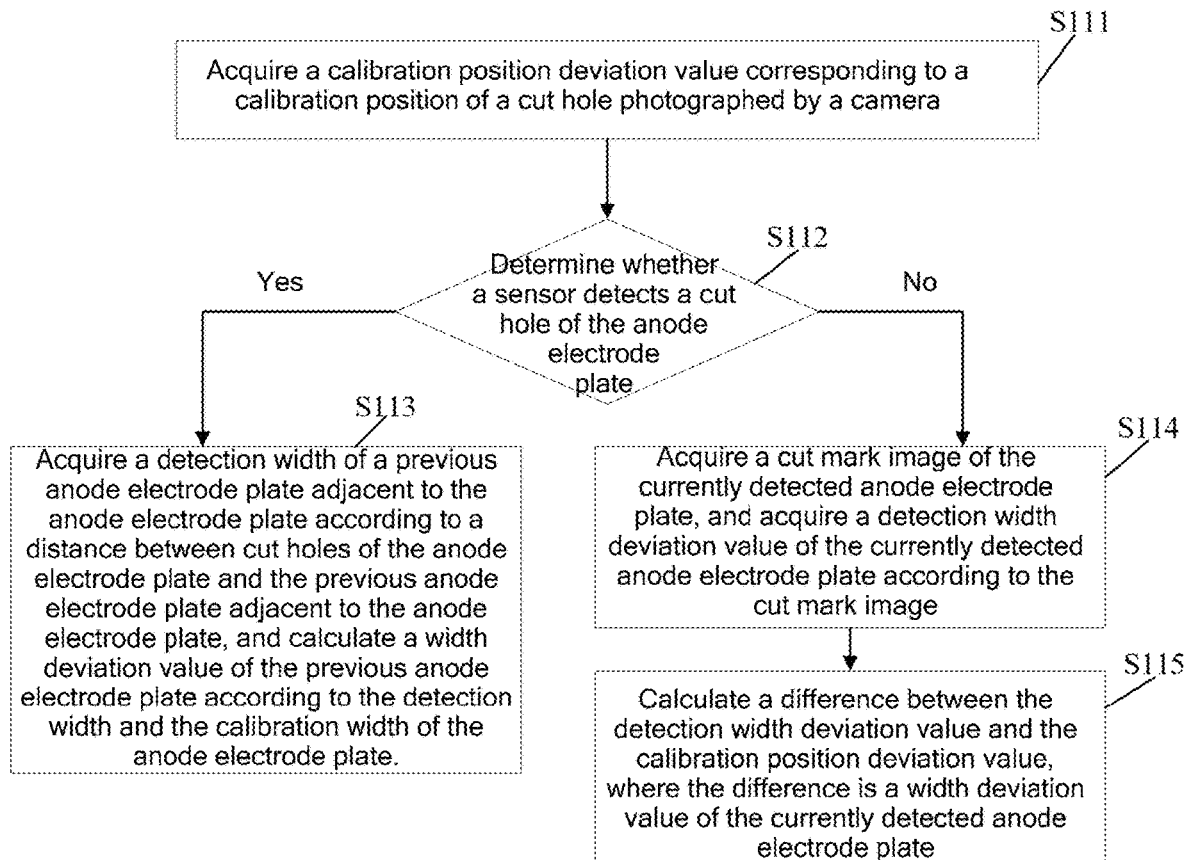
FIG. 5 is a flow chart of a method for calculating a first width deviation value provided in a method for controlling misalignment of electrode plates in an embodiment of the present application.

Specifically, as shown in FIG. 5, the calculating a first width deviation value corresponding to the anode electrode plate according to the cut hole position information and a calibration width of the anode electrode plate includes:

S111: A calibration position deviation value corresponding to a calibration position of a cut hole photographed by a camera is acquired.

When the sensor detects a cut hole of the anode electrode plate for the first time, it is considered that the current anode electrode plate is the first anode electrode plate, and in this case, the camera is triggered by a fixed distance to capture an image including a cut mark; and cut mark position information is acquired according to the image, and then a deviation value is calculated according to the cut mark position information and a calibration cut mark, where the deviation value is the calibration position deviation value corresponding to a calibration position of a cut hole photographed by a camera. The calibration cut mark refers to cut mark information acquired when the cut mark is manufactured. The cut mark position information refers to a position of the cut mark in an image currently captured by the camera. The deviation value can be calculated according to a pixel of the cut mark position and a pixel corresponding to the calibration cut mark.

The calibration position deviation value is provided to correct position information of a cut mark in an image captured by the camera, such that a position of the cut mark can be accurately determined, that is, a compensation value for a feed position of the cathode electrode plate can be accurately acquired.

When the sensor detects the cut hole of the anode electrode plate for the first time, the photographing of the camera is triggered by a fixed distance, and the fixed distance refers to a condition that allows the photographing of the camera. Specifically, a first distance between the sensor and the camera is acquired, and the first distance is related to positions of the sensor and the camera, and refers to a distance from the sensor to the camera and specifically to a distance between positions of the anode electrode plate on which the sensor and the camera are projected respectively in a direction perpendicular to the anode electrode plate; position information of the cut hole of the anode electrode plate detected by the sensor corresponding to the anode electrode plate for the first time is acquired, the position information includes a second distance, and the second distance refers to a distance between a position of the cut hole and the sensor; and when a distance corresponding to position information of a cut hole photographed currently by the camera is equal to a sum of the first distance and the second distance, it is determined that the photographing conditions of the camera are met, that is, when the fixed distance is met, the photographing of the camera is triggered.

S112: Whether the sensor detects the cut hole of the anode electrode plate is determined.

If the cut hole of the anode electrode plate is detected, the following S113 is conducted; and if the cut hole of the anode electrode plate is not detected and the currently detected anode electrode plate meets the photographing conditions of the camera, the following S114 and S115 are conducted.

If a cut hole is not completely broken during production of the cut hole or if a cut hole is not in a detection range of the sensor due to mis-operation of a material belt, the sensor cannot detect the cut hole of an anode electrode plate. When the cut hole of the anode electrode plate is detected, a first width deviation value is acquired according to information of the detected cut hole; and when the cut hole of the anode electrode plate is not detected, a first width deviation value is acquired according to a cut mark image captured by the camera. Thus, in the embodiment of the present application, a compensation value for a feed position of a cathode electrode plate can be accurately and reliably acquired to reduce a probability of poor misalignment of fed electrode plates.

S113: A detection width of a previous anode electrode plate adjacent to the anode electrode plate is acquired according to a distance between cut holes of the anode electrode plate and the previous anode electrode plate adjacent to the anode electrode plate, and a width deviation value of the previous anode electrode plate is calculated according to the detection width and the calibration width of the anode electrode plate, where the width deviation value can be understood as a distance in a feed direction of the stacking machine.

The detection width refers to a width of an anode electrode plate detected in real time according to a cut hole. A difference between the detection width and the calibration width is calculated, where the difference is the first width deviation value.

For example, when a width difference of the first anode electrode plate is currently required, a detection width $D_2-D_1$ of the first anode electrode plate is acquired according to positions of cut holes of the first and second anode electrode plates, and a difference between the detection width $D_2-D_1$ and the set width $W_1$ is calculated to obtain a width deviation value of the first anode electrode plate, that is, $\delta_2 = D_2 - D_1 - W_1$. $\delta_2$ is acquired to compensate for a feed position of the second cathode electrode plate.

S114: A cut mark image of the currently detected anode electrode plate is acquired, and a detection width deviation value of the currently detected anode electrode plate is acquired according to the cut mark image.

The cut mark image can be captured by the CCD camera. The detection width deviation value refers to a width deviation value of the anode electrode plate detected according to an image captured by the camera. The detection width deviation value may be acquired as follows: a detection width of an anode electrode plate is acquired according to a cut mark image, and a difference between the detection width and the calibration width is calculated, where the difference is the detection width deviation value.

The currently detected anode electrode plate meeting the photographing conditions of the camera includes: a cut mark image of a cut hole that is of a previously detected anode electrode plate and corresponds to the cut hole of the anode electrode plate is acquired, where the cut mark image of the cut hole of the previously detected anode electrode plate includes a first cut mark distance; a cut mark image of the cut hole of the anode electrode plate is acquired, where the cut mark image of the cut hole of the anode electrode plate includes a second cut mark distance; and when the second cut mark distance is equal to a sum of the first cut mark distance and the calibration width of the anode electrode plate, it is determined that the photographing conditions of the camera are met. For example, the first cut mark distance is $D'_{n-1}$, the second cut mark distance is $D'_n$, and the calibration width of the anode electrode plate is $W_1$; and when $D'_n = D'_{n-1} + W_1$, the photographing of the camera is triggered. The first cut mark distance and the second cut mark distance are distances between cut marks of anode electrode plates photographed by the camera and a same origin, respectively; and a difference between the two distances can be calculated according to a distance between the cut marks of the anode electrode plate and the previous anode electrode plate adjacent to the anode electrode plate, and the difference can represent a width of a previous anode electrode plate among the anode electrode plate and the previous anode electrode plate adjacent to the anode electrode plate.

In some embodiments, the detection width deviation value can be directly acquired through photographing by the camera. According to the above description, the photographing of the camera can be triggered by $D'_n = D'_{n-1} + W_1$ starting from the second electrode plate, that is, according to the previous photographing position, the advance of another standard width $W_1$ can trigger the photographing of the camera to obtain a calibration position deviation value of the cut hole of the anode electrode plate, that is, the detection width deviation value.

S115: A difference between the detection width deviation value and the calibration position deviation value is calculated, where the difference is a width deviation value of the currently detected anode electrode plate.

The width deviation value of the anode electrode plate is the first width deviation value. For example, if a cut hole of the second anode electrode plate is not detected, a detection width deviation value $\delta'_2$ of the second anode electrode plate can be acquired as above, and a first width deviation value corresponding to the second anode electrode plate is calculated according to $\delta_2 = \delta'_2 - \delta_1$, where $\delta_1$ represents a calibration position deviation value corresponding to a calibration position of a cut hole photographed by a camera and $\delta_2$ represents a first width deviation value.

A value to compensate for a feed position of the cathode electrode plate by the anode electrode plate is acquired mainly by two methods above, such that the cathode electrode plate can be placed at an appropriate position of the anode electrode plate.

S12: Tab position information of a cathode electrode plate is acquired, and a second width deviation value corresponding to the cathode electrode plate is calculated according to the tab position information and a calibration width of the cathode electrode plate.

The tab position information refers to a specific position of a tab on the cathode electrode plate; and in an embodiment of the present application, a position of a tab is detected to obtain a width of the cathode electrode plate. A calibration width of the cathode electrode plate refers to a calibration value of a width of the cathode electrode plate, and is set according to a process. The second width deviation value refers to a value to compensate for a width of the cathode electrode plate.

Figure 6:
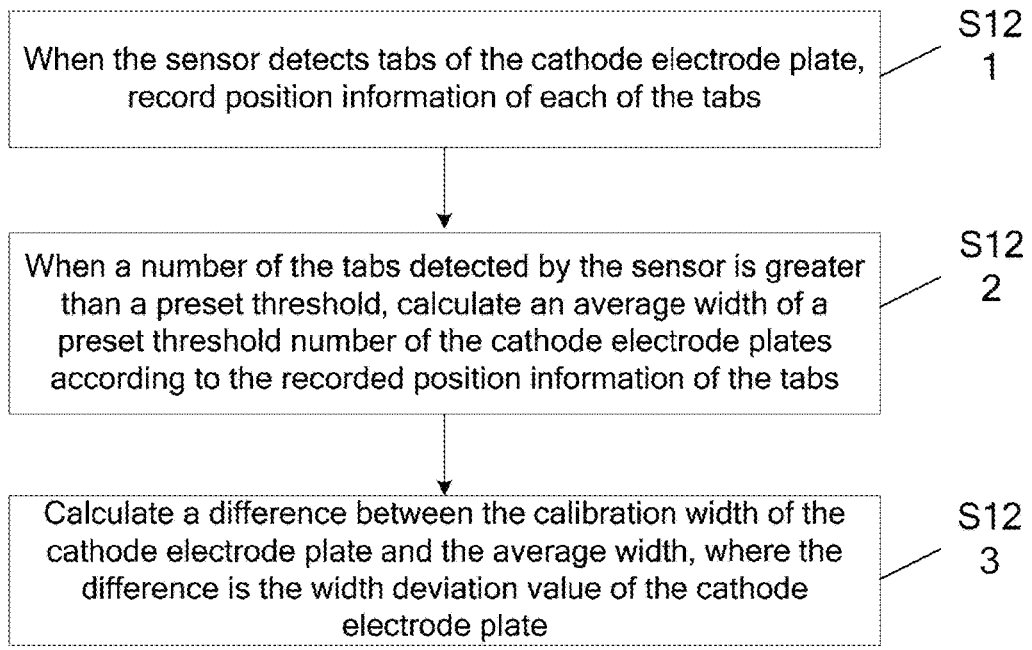
FIG. 6 is a flow chart of a method for calculating a second width deviation value provided in a method for controlling misalignment of electrode plates in an embodiment of the present application.

In an embodiment of the present application, as shown in FIG. 6, the calculating a second width deviation value corresponding to the cathode electrode plate according to the tab position information and a calibration width of the cathode electrode plate includes:

S121: when the sensor detects tabs of the cathode electrode plate, position information of each of the tabs is recorded;

S122: when a number of the tabs detected by the sensor is greater than a preset threshold, an average width of a preset threshold number of the cathode electrode plates is calculated according to the recorded position information of the tabs; and S123: a difference between the calibration width of the cathode electrode plate and the average width is calculated, where the difference is the width deviation value of the cathode electrode plate.

The position information corresponding to the tab refers to a position of the tab on the cathode electrode plate detected by the sensor, and can be specifically a distance between the sensor and the tab. The preset threshold can be customized by a system or artificially set, such as 10.

The average width of the cathode electrode plates can be calculated according to the following formula:

$$W' = \frac{L_m - L_{m-k}}{k}$$

where m represents a number of cathode electrode plates currently detected, $L_m$ represents a position of the $m^{th}$ cathode electrode plate currently detected, k represents a set number of cathode electrode plates having an average width, and $L_{m-k}$ represents a position of the $(m-k)^{th}$ cathode electrode plate.

Whether a number m of cathode electrode plates detected by the sensor corresponding to the cathode electrode plates is greater than k is determined, and if m is greater than k, the average width is calculated according to the above formula.

The width deviation value of the cathode electrode plate is $\varepsilon = W_2 - W'$, where $W_2$ represents a calibration width of the cathode electrode plate.

In an embodiment of the present application, a width of a cathode electrode plate is acquired according to tab position information of a group of cathode electrode plates, for example, the group of cathode electrode plates includes 5 to 10 cathode electrode plates. The averaging manner can improve an accuracy of determination of a width of a cathode electrode plate and thus improve an accuracy of calculation of a width deviation value of the cathode electrode plate subsequently, such that the width of the cathode electrode plate can be accurately compensated. It should be noted that a manner to calculate a width of a cathode electrode plate is not limited to the above averaging manner, and another calculation method can also be adopted, such as an interpolation method.

In an embodiment of the present application, a width of a cathode electrode plate is uniformly compensated through a tab of the cathode electrode plate, such that the cathode electrode plate has excellent width consistency. In addition, when a width of a cathode electrode plate is dynamically adjusted, misalignment of tabs can be controlled to correct misalignment of the tabs.

S13: When the anode electrode plate and the cathode electrode plate are stacked, a feed position of the cathode electrode plate is adjusted according to the first width deviation value, and a cut width of the cathode electrode plate is compensated according to the second width deviation value, such that a preset distance is kept between edges of the cathode electrode plate and the anode electrode plate overlapping with each other.

The stacking refers to a process where an anode electrode plate and a cathode electrode plate are isolated and stacked sequentially by the stacking machine or the like to produce an electrochemical cell. During the above process, a feed position of the cathode electrode plate can be determined according to a first width deviation value calculated above. Specifically, a feed position of the second cathode electrode plate is determined according to a first width deviation value of the first anode electrode plate, a feed position of the third cathode electrode plate is determined according to a first width deviation value of the second anode electrode plate, and so on. The second width deviation value is provided to compensate for a cut width of a cathode electrode plate. If a set cut width of a cathode electrode plate is too small, the second width deviation value is increased; and if a set cut width of a cathode electrode plate is too large, the second width deviation value is decreased. A width of each cathode electrode plate can be compensated separately. The process of adjusting a feed position of a cathode electrode plate and the process of compensating a width of a cathode electrode plate can be conducted simultaneously, and an execution order of the processes is not limited here.

A preset distance is kept between edges of the cathode electrode plate and the anode electrode plate overlapping with each other, that is, after the cathode electrode plate and the anode electrode plate are arranged in an overlapping manner, an edge of the cathode electrode plate is misaligned with an edge of the anode electrode plate at the preset distance, where the preset distance may be 2±0.9 mm.

The embodiment of the present application provides a method for controlling misalignment of electrode plates, where a preset distance can be kept between edges of the cathode electrode plate and the anode electrode plate overlapping with each other, which can avoid poor misalignment of the cathode electrode plate and the anode electrode plate and improve a yield rate of electrochemical cells; the embodiment of present application can allow differential deviation compensation for cathode electrode plates, such that finally, widths of the cathode electrode plates can be maintained well consistent; and when a width of a cathode electrode plate is dynamically adjusted, misalignment of tabs can be controlled to correct misalignment of the tabs.

Figure 7:
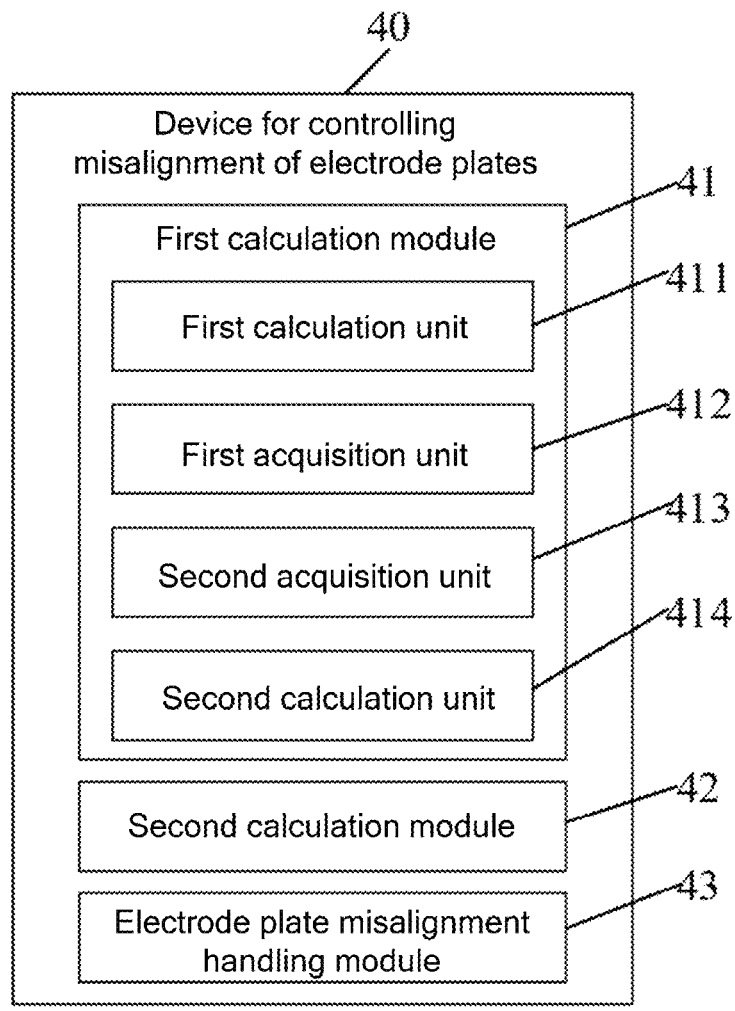
FIG. 7 is a schematic structural diagram of a device for controlling misalignment of electrode plates provided in an embodiment of the present application.

FIG. 7 is a schematic structural diagram of a device for controlling misalignment of electrode plates provided in an embodiment of the present application. The device 40 for controlling misalignment of electrode plates includes a first calculation module 41, a second calculation module 42, and an electrode plate misalignment handling module 43.

The first calculation module 41 is configured to acquire cut hole position information of an anode electrode plate and calculate a first width deviation value corresponding to the anode electrode plate according to the cut hole position information and a calibration width of the anode electrode plate; the second calculation module 42 is configured to acquire tab position information of a cathode electrode plate and calculate a second width deviation value corresponding to the cathode electrode plate according to the tab position information and a calibration width of the cathode electrode plate; and the electrode plate misalignment handling module 43 is configured to: when the anode electrode plate and the cathode electrode plate are stacked, adjust a feed position of the cathode electrode plate according to the first width deviation value, and compensate for a cut width of the cathode electrode plate according to the second width deviation value, such that a preset distance is kept between edges of the cathode electrode plate and the anode electrode plate overlapping with each other.

The first calculation module 41 includes a first calculation unit 411, and the first calculation unit 411 is configured to: when a sensor detects a cut hole of the anode electrode plate, acquire a detection width of a previous anode electrode plate adjacent to the anode electrode plate according to a distance between cut holes of the anode electrode plate and the previous anode electrode plate adjacent to the anode electrode plate, and calculate a width deviation value of the previous anode electrode plate according to the detection width and the calibration width of the anode electrode plate.

In some embodiments, the first calculation module 41 further includes a first acquisition unit 412, a second acquisition unit 413, and a second calculation unit 414. The first acquisition unit 412 is configured to acquire a calibration position deviation value corresponding to a calibration position of a cut hole photographed by a camera; the second acquisition unit 413 is configured to: when the sensor does not detect the cut hole of the anode electrode plate and the currently detected anode electrode plate meets photographing conditions of the camera, acquire a cut mark image of the currently detected anode electrode plate, and acquire a detection width deviation value of the currently detected anode electrode plate according to the cut mark image; and the second calculation unit 414 is configured to calculate a difference between the detection width deviation value and the calibration position deviation value, where the difference is a width deviation value of the currently detected anode electrode plate. The first acquisition unit 412 is specifically configured to: when the sensor detects the cut hole of the anode electrode plate for the first time and the photographing conditions of the camera are met, acquire a cut mark image corresponding to the cut hole, and acquire the calibration position deviation value according to the cut mark image and a calibration position of the cut hole of the anode electrode plate.

When the sensor detects the cut hole of the anode electrode plate for the first time, that the photographing conditions of the camera are met specifically includes: a first distance between the sensor and the camera is acquired; position information of the cut hole of the anode electrode plate detected by the sensor for the first time is acquired, where the position information includes a second distance; and when a distance corresponding to position information of a cut hole photographed currently by the camera is equal to a sum of the first distance and the second distance, it is determined that the photographing conditions of the camera are met.

When the sensor detects the cut hole of the anode electrode plate not for the first time, that the photographing conditions of the camera are met specifically includes: a cut mark image of a cut hole that is of a previously detected anode electrode plate and corresponds to the cut hole of the anode electrode plate is acquired, where the cut mark image of the cut hole of the previously detected anode electrode plate includes a first cut mark distance; a cut mark image of the cut hole of the anode electrode plate is acquired, where the cut mark image of the cut hole of the anode electrode plate includes a second cut mark distance; and when the second cut mark distance is equal to a sum of the first cut mark distance and the calibration width of the anode electrode plate, it is determined that the photographing conditions of the camera are met.

The second calculation module 42 is specifically configured to: when the sensor detects tabs of the cathode electrode plate, record position information of each of the tabs; when a number of the tabs detected by the sensor is greater than a preset threshold, calculate an average width of a preset threshold number of the cathode electrode plates according to the recorded position information of the tabs; and calculate a difference between the calibration width of the cathode electrode plate and the average width, where the difference is the width deviation value of the cathode electrode plate.

It should be noted that the device for controlling misalignment of electrode plates may be used to implement the method for controlling misalignment of electrode plates provided in the embodiment of the present application, and has corresponding functional modules and beneficial effects of implementation of the method. Technical details not described in the embodiment of the device for controlling misalignment of electrode plates may refer to the method for controlling misalignment of electrode plates provided in the embodiment of the present application.

The embodiment of the present application provides electrode plates, where the electrode plates include an anode electrode plate and a cathode electrode plate; and the anode electrode plate and the cathode electrode plate can be subjected to a misalignment treatment by the method for controlling misalignment of electrode plates described above, such that a preset distance is kept between edges of the cathode electrode plate and the anode electrode plate overlapping with each other. The electrode plates provided by the embodiment of the present application can ensure a correct position of a cathode electrode plate on an anode electrode plate, thereby improving a yield rate of electrode plates.

The embodiment of the present application provides an electrochemical cell, including a separator, and the electrode plates described in the above embodiment. The electrochemical cell has advantages such as high yield rate and strong stability.

The embodiment of the present application provides a battery, including an electrolyte, a packaging case, and the electrochemical cell described above. The battery has advantages such as high yield rate and strong stability.

Finally, it should be noted that the above embodiments are merely provided to explain the technical solutions of the present application, rather than limit the present application.

Under the idea of the present application, the above embodiments or technical features in different embodiments may also be combined, the steps may be implemented in any order, and there are many variations in different aspects of the present application described above, which are not provided in detail for the sake of brevity. Although the present application is described in detail with reference to the above embodiments, a person of ordinary skill in the art should understand that they can still modify the technical solutions described in the above embodiments or make equivalent substitutions for some technical features therein, and these modifications or substitutions do not make the essence of corresponding technical solutions depart from the scope of the technical solutions of the embodiments of the present application.

What is claimed is:

1. A method for controlling misalignment of electrode plates, comprising:
    acquiring cut hole position information of an anode electrode plate, and calculating a first width deviation value corresponding to the anode electrode plate according to the cut hole position information and a calibration width of the anode electrode plate;
    acquiring tab position information of a cathode electrode plate, and calculating a second width deviation value corresponding to the cathode electrode plate according to the tab position information and a calibration width of the cathode electrode plate; and
    when the anode electrode plate and the cathode electrode plate are stacked, adjusting a feed position of the cathode electrode plate according to the first width deviation value, and compensating for a cut width of the cathode electrode plate according to the second width deviation value, such that a preset distance is kept between edges of the cathode electrode plate and the anode electrode plate overlapping with each other.

2. The method according to claim 1, wherein the calculating a first width deviation value corresponding to the anode electrode plate according to the cut hole position information and a calibration width of the anode electrode plate comprises:
    when a sensor detects a cut hole of the anode electrode plate, acquiring a detection width of a previous anode electrode plate adjacent to the anode electrode plate according to a distance between cut holes of the anode electrode plate and the previous anode electrode plate adjacent to the anode electrode plate, and calculating a width deviation value of the previous anode electrode plate according to the detection width and the calibration width of the anode electrode plate.

3. The method according to claim 2, further comprising:
    acquiring a calibration position deviation value corresponding to a calibration position of a cut hole photographed by a camera;
    when the sensor does not detect the cut hole of the anode electrode plate and the currently detected anode electrode plate meets photographing conditions of the camera, acquiring a cut mark image of the currently detected anode electrode plate, and acquiring a detection width deviation value of the currently detected anode electrode plate according to the cut mark image; and
    calculating a difference between the detection width deviation value and the calibration position deviation value, wherein the difference is a width deviation value of the currently detected anode electrode plate.

4. The method according to claim 3, wherein the acquiring a calibration position deviation value corresponding to a calibration position of a cut hole photographed by a camera comprises:
    when the sensor detects the cut hole of the anode electrode plate for a first time and the photographing conditions of the camera are met, acquiring a cut mark image corresponding to the cut hole, and acquiring the calibration position deviation value according to the cut mark image and a calibration position of the cut hole of the anode electrode plate.

5. The method according to claim 4, wherein when the sensor detects the cut hole of the anode electrode plate for a first time, that the photographing conditions of the camera are met specifically comprises:
    acquiring a first distance between the sensor and the camera;
    acquiring position information of the cut hole of the anode electrode plate detected by the sensor for the first time, wherein the position information comprises a second distance; and
    when a distance corresponding to position information of a cut hole photographed currently by the camera is equal to a sum of the first distance and the second distance, determining that the photographing conditions of the camera are met.

6. The method according to claim 3, wherein when the sensor detects the cut hole of the anode electrode plate not for the first time, that the photographing conditions of the camera are met specifically comprises:
    acquiring a cut mark image of a cut hole that is of a previously detected anode electrode plate and corresponds to the cut hole of the anode electrode plate, wherein the cut mark image of the cut hole of the previously detected anode electrode plate comprises a first cut mark distance;
    acquiring a cut mark image of the cut hole of the anode electrode plate, wherein the cut mark image of the cut hole of the anode electrode plate comprises a second cut mark distance; and
    when the second cut mark distance is equal to a sum of the first cut mark distance and the calibration width of the anode electrode plate, determining that the photographing conditions of the camera are met.

7. The method according to claim 1, wherein the calculating a second width deviation value corresponding to the cathode electrode plate according to the tab position information and a calibration width of the cathode electrode plate comprises:
    when the sensor detects tabs of the cathode electrode plate, recording position information of each of the tabs;
    when a number of the tabs detected by the sensor is greater than a preset threshold, calculating an average width of a preset threshold number of the cathode electrode plates according to the recorded position information of the tabs; and
    calculating a difference between the calibration width of the cathode electrode plate and the average width, wherein the difference is the width deviation value of the cathode electrode plate.

8. A device for controlling misalignment of electrode plates, comprising:
    a first calculation module configured to acquire cut hole position information of an anode electrode plate and calculate a first width deviation value corresponding to the anode electrode plate according to the cut hole position information and a calibration width of the anode electrode plate;

a second calculation module configured to acquire tab position information of a cathode electrode plate and calculate a second width deviation value corresponding to the cathode electrode plate according to the tab position information and a calibration width of the cathode electrode plate; and an electrode plate misalignment handling module configured to: when the anode electrode plate and the cathode electrode plate are stacked, adjust a feed position of the cathode electrode plate according to the first width deviation value, and compensate for a cut width of the cathode electrode plate according to the second width deviation value, such that a preset distance is kept between edges of the cathode electrode plate and the anode electrode plate overlapping with each other.

9. The device according to claim 8, wherein the first calculation module comprises:

a first calculation unit configured to: when a sensor detects a cut hole of the anode electrode plate, acquire a detection width of a previous anode electrode plate adjacent to the anode electrode plate according to a distance between cut holes of the anode electrode plate and the previous anode electrode plate adjacent to the anode electrode plate, and calculate a width deviation value of the previous anode electrode plate according to the detection width and the calibration width of the anode electrode plate.

10. The device according to claim 9, wherein the first calculation module further comprises:

a first acquisition unit configured to acquire a calibration position deviation value corresponding to a calibration position of a cut hole photographed by a camera;

a second acquisition unit configured to: when the sensor does not detect the cut hole of the anode electrode plate and the currently detected anode electrode plate meets photographing conditions of the camera, acquire a cut mark image of the currently detected anode electrode plate, and acquire a detection width deviation value of the currently detected anode electrode plate according to the cut mark image; and a second calculation unit configured to calculate a difference between the detection width deviation value and the calibration position deviation value, wherein the difference is a width deviation value of the currently detected anode electrode plate.

11. The device according to claim 10, wherein the first acquisition unit is specifically configured to:

when the sensor detects the cut hole of the anode electrode plate for a first time and the photographing conditions of the camera are met, acquire a cut mark image corresponding to the cut hole, and acquire the calibration position deviation value according to the cut mark image and a calibration position of the cut hole of the anode electrode plate.

12. The device according to claim 11, wherein when the sensor detects the cut hole of the anode electrode plate for the first time, that the photographing conditions of the camera are met specifically comprises:

acquiring a first distance between the sensor and the camera;

acquiring position information of the cut hole of the anode electrode plate detected by the sensor for the first time, wherein the position information comprises a second distance; and when a distance corresponding to position information of a cut hole photographed currently by the camera is equal to a sum of the first distance and the second distance, determining that the photographing conditions of the camera are met.

13. The device according to claim 10, wherein when the sensor detects the cut hole of the anode electrode plate not for the first time, that the photographing conditions of the camera are met specifically comprises:

acquiring a cut mark image of a cut hole that is of a previously detected anode electrode plate and corresponds to the cut hole of the anode electrode plate, wherein the cut mark image of the cut hole of the previously detected anode electrode plate comprises a first cut mark distance;

acquiring a cut mark image of the cut hole of the anode electrode plate, wherein the cut mark image of the cut hole of the anode electrode plate comprises a second cut mark distance; and when the second cut mark distance is equal to a sum of the first cut mark distance and the calibration width of the anode electrode plate, determining that the photographing conditions of the camera are met.

14. The device according to claim 8, wherein the second calculation module is specifically configured to:

when the sensor detects tabs of the cathode electrode plate, record position information of each of the tabs;

when a number of the tabs detected by the sensor is greater than a preset threshold, calculate an average width of a preset threshold number of the cathode electrode plates according to the recorded position information of the tabs; and calculate a difference between the calibration width of the cathode electrode plate and the average width, wherein the difference is the width deviation value of the cathode electrode plate.

15. A device for controlling misalignment of electrode plates, comprising: a sensor, a camera, and a controller, wherein the controller is connected to each of the sensor and the camera;

the sensor is configured to detect cut hole position information of an anode electrode plate and detect tab position information of a cathode electrode plate;

the camera is configured to acquire a cut mark image corresponding to the anode electrode plate; and the controller further comprises:

at least one processor and a memory in communication connection with the at least one processor, wherein the memory stores an instruction capable of being executed by the at least one processor, and the instruction is executed by the at least one processor, such that the at least one processor executes the method for controlling misalignment of electrode plates according to claim 1 based on the cut hole position information, the tab position information, and the cut mark image.

16. Electrode plates, wherein the electrode plates comprise an anode electrode plate and a cathode electrode plate; and the anode electrode plate and the cathode electrode plate are subjected to a misalignment treatment by the method for controlling misalignment of electrode plates according to claim 1, such that a preset distance is kept between edges of the cathode electrode plate and the anode electrode plate overlapping with each other.

17. An electrochemical cell, comprising a separator, and the anode electrode plate and the cathode electrode plate according to claim 16.

18. A battery, comprising an electrolyte, a packaging case, and the electrochemical cell according to claim 17.

\* \* \* \* \*